United States Patent
Zafiroglu (10) Patent No.: US 7,255,761 B2
(45) Date of Patent: Aug. 14, 2007

(54) STITCH-BONDED AND GATHERED COMPOSITES AND METHODS FOR MAKING SAME

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 0 days.

(21) Appl. No.: 11/147,901

(22) Filed: Jun. 8, 2005

(65) Prior Publication Data

US 2005/0227038 A1    Oct. 13, 2005

Related U.S. Application Data

(62) Division of application No. 10/611,287, filed on Jul. 1, 2003, now Pat. No. 6,936,327.

(51) Int. Cl.
| | |
|---|---|
| B29C 61/00 | (2006.01) |
| B29C 65/02 | (2006.01) |
| B32B 37/00 | (2006.01) |
| D04H 13/00 | (2006.01) |

(52) U.S. Cl. .......................... 156/85; 156/84; 156/148; 264/230; 264/257; 264/258; 264/342 RE; 112/475.22

(58) Field of Classification Search ............. None
See application file for complete search history.

(56) References Cited

U.S. PATENT DOCUMENTS

| | | | |
|---|---|---|---|
| 3,664,157 A | 5/1972 | Kochta et al. | |
| 3,837,943 A | 9/1974 | Ploch et al. | |
| 4,579,763 A * | 4/1986 | Mitman | ........................ 428/95 |
| 4,704,321 A | 11/1987 | Zafiroglu | |
| 4,773,238 A | 9/1988 | Zafiroglu | |
| 4,891,957 A | 1/1990 | Strack et al. | |
| 4,988,551 A * | 1/1991 | Zegler | ........................ 428/41.8 |
| 5,032,122 A * | 7/1991 | Noel et al. | ................... 604/391 |
| 5,310,590 A | 5/1994 | Tochacek et al. | |
| 5,624,729 A | 4/1997 | Cohen et al. | |
| 5,707,710 A | 1/1998 | Zafiroglu | |
| 5,879,779 A | 3/1999 | Zafiroglu | |
| 6,407,018 B1 | 6/2002 | Zafiroglu | |
| 6,521,554 B1 * | 2/2003 | Wildeman | ................... 442/366 |

FOREIGN PATENT DOCUMENTS

DE            153712 A        1/1982

* cited by examiner

*Primary Examiner*—Jenna Befumo
(74) *Attorney, Agent, or Firm*—The H.T. Than Law Group (57) ABSTRACT

Disclosed herein is a composite comprising at least one heat shrinkable adhesive layer stitch-bonded with yarns, which shrink less than the adhesive layer or do not shrink, when the adhesive layer is exposed to heat. The stitch-bonded yarns form loops upstanding from the shrunk adhesive layer and the loops create a textured surface on the composite, and the composite is substantially inelastic after the adhesive layer is shrunk. The composite may further comprise at least one fibrous layer stitch-bonded to the shrinkable adhesive layer, and the fibrous layer is less shrinkable than the adhesive layer or is substantially non-shrinkable.

19 Claims, 6 Drawing Sheets

STITCH-BONDED AND GATHERED COMPOSITES AND METHODS FOR MAKING SAME

CROSS-REFERENCE TO RELATED APPLICATION

This application is a division of U.S. patent application Ser. No. 10/611,287 filed Jul. 1, 2003 now U.S. Pat. No. 6,936,327.

FIELD OF THE INVENTION

The present invention relates to stitch-bonded and gathered composite fabrics containing a continuous shrinkable layer.

BACKGROUND OF THE INVENTION

A folded or buckled composite structure can be produced by attaching a continuous fibrous layer to a continuous shrinkable layer at discrete points. The attachments can be achieved by intermittent thermal, ultrasonic or adhesive bonds, and by mechanical or hydraulic needling. As disclosed in commonly owned, co-pending patent application entitled "Textile Laminate Having Pile-Like Surface," bearing Ser. No. 10/455,594 and filed on Jun. 5, 2003, by the same inventor as the present invention, intermittently bonded and subsequently gathered or folded fibrous products that present upstanding loops or buckled fibers on their surface simulate the "loop pile" of floor coverings. This commonly owned, co-pending patent application is incorporated herein by reference in its entirety. These textured products offer features and advantages including dust, dirt, and liquid penetration resistance combined with resilience against "matting" or collapsing of pile under the heavy load-reload of heavy traffic. In one embodiment, the height of the loops is about 2 mm and the loops are spaced about 2 mm apart, matching conventional pile carpets. The relatively large height and spacing produce substantial anchoring bonds and leave sufficient distance between bonds to buckle the relatively heavy yarns or fabrics forming the buckled "pile."

Also, as discussed in this commonly owned, co-pending patent application, the inventor has discovered that fibrous structures consisting of shallower and denser loops of fibers buckled or bent with a higher frequency provide improved resistance to "matting" or crushing under heavy repetitive loading that can occur on flooring, upholstery or wall covering, provided that the buckled or looped fibers descend into a layer of adhesive within a length of less than about 2 mm. The final product is dimensionally stable and resists planar deformation.

A folded or buckled composite structure can also be produced by stitch-bonding a continuous fibrous layer with shrinkable yarns at discrete points. Stitch-bonding of shrinkable yarns to non-shrinkable or less shrinkable fibrous layers in order to produce denser, shorter and more frequent buckled loops, offers several advantages. The first advantage is that the attachment points are perforations, which soften rather than harden the stitched fibrous substrate, thereby making it more amenable to gather and bulk. The second advantage is that, unlike intermittent bonding, the attachment frequency can increase by using smaller needles, spacings (higher gauges) and smaller stitch spacings (higher CPI). With intermittent bonding, space should be provided for the bonds, and to make the bonds stronger the space taken by the bonds must be relatively large. The third advantage with stitch-bonding is that a large variety of yarns and shrinkable fibrous layers can be used. For example, non-shrinkable or shrinkable yarns can be used to attach a fibrous layer to an elastic, tensioned shrinkable substrate, as illustrated for example in U.S. Pat. No. 4,891,957, or tensioned elastic yarns can be used to shrink and bulk a fibrous substrate, as illustrated in U.S. Pat. Nos. 4,704,321 and 4,773,238. In addition heat-shrinkable partially oriented yarns (POY) can be attached to a fibrous substrate, as illustrated for example in U.S. Pat. Nos. 5,707,710, 5,879,779 and 6,407,018. In addition to gathering the fibrous substrate, the network of stitching yarns also reinforces the gathered product.

For use as floor or wall coverings, the stitch-bonded and gathered products known heretofore, however, require adhesives or binders at least on the upper strata to anchor the bulked layers. To obviate the need for adhesives or binders in the upper strata, the dimensional stability of the conventional stitch-bonded and gathered products needs to improve. The instability of the conventional products originates from the elasticity or the instability of the shrunk stitch-bonded yarn system, or the elasticity or the instability of the stitched substrate. Even products that are stitched with partially oriented yarns (POY) and subsequently gathered and heat set could not be fully stabilized without some distortion, because the slack in the stitching system can not be completely removed by tentering without removing at least some of the gather. The conventional products typically require additional treatment with binders or resins to improve their dimensional stability. Molded or embossed versions of the conventional stitch-bonded fabrics tend to be deformable and lose their shape, unless encased in resin concentrations or co-molded or co-embossed with stiff backings. However, resin treatment sufficient to stabilize these products also gives the surface of the product a firm or harsh non-fabric-like hand, while stiff backings produce inflexibly stiff products.

Additionally, the conventional stitch-bonded gathered products aimed for uses that require crush-resistance need an adhesive layer sufficiently heavy to encase the lower strata of the buckled loops, up to a uniform and well-controlled height, while leaving the upper strata free of adhesive binder in order to preserve the soft textile feel at the surface. Low-viscosity thermoset binders suitable for this purpose tend to seep upward towards the surface of such products, while suitable thermoplastic binders introduced from the backside require heat and pressure that tend to flatten the structure. Introducing a layer of thermoplastic binder as a co-substrate along with the fibrous layer would cause the binder layer to buckle as well and follow the contour of the buckled fibrous layer, failing to concentrate near the bottom within the lower strata. The need of locating a planar adhesive (binder) layer in the lower strata is even more important when the product is laminated to a backing layer. A planar adhesive layer located in the lower strata can be preheated and pre-activated before lamination, thus minimizing the time and pressure needed to laminate, and, in turn, minimizing the flattening effect of the lamination.

Therefore the need exists for stitch-bonded products that have improved dimensional stability.

SUMMARY OF THE INVENTION

The present invention is directed to a stitch-bonded, gathered fabric that includes a layer that shrinks more than the stitching yarns for any end uses.

The present invention is also directed to a stitch-bonded fabric that is gathered by a shrunk layer for any end uses.

The present invention is also directed to a fabric containing a shrinkable layer stitch-bonded with yarns that are less shrinkable than the shrinkable layer and having sufficient dimensional stability for use as floor or wall coverings.

An embodiment of the present invention is directed to a composite comprising at least one heat shrinkable layer stitch-bonded with a network of yarns wherein the shrinking temperature of the shrinkable layer is lower than the melting temperature of the stitch-bonded yarns. When the shrinkable layer shrinks, it causes the stitch-bonded yarns to form loops emanating from the shrunk adhesive, and the shrunk layer is substantially inelastic. The loops have a frequency of at least 10 per inch in at least one direction and a height of less than about 2.0 mm.

Another embodiment is directed to a composite comprising at least one heat shrinkable layer stitch-bonded with yarns that shrink less than the heat shrinkable layer when the composite is exposed to heat, wherein the stitch-bonded yarns form loops upstanding from the shrunk layer and the loops create a textured surface on the composite and wherein the composite is substantially inelastic after the heat shrinkable layer is shrunk.

The shrinkable layer can be an adhesive layer. Adhesive or binder can also be applied to the fabric either before or after gathering. The composite may have an adhesive layer stitch-bonded to the heat shrinkable layer. The adhesive layer can be shrinkable or substantially non-shrinkable The stretchability of the composite is less than about 20% strain under a 5 lb/inch pull on a 1 inch wide by 8 inch long strip of the composite. The shrunk adhesive layer may bond to the stitch-bonded yarns to provide enhanced dimensional stability for the composite. Suitable heat shrinkable layers and adhesive layers include non-woven fabrics, woven fabrics, knit fabrics, or plastic films. The heat shrinkable layer is preferably shrinkable by about 10% to about 50% in at least one direction and preferably in two directions. The heat shrinkable layer is shrinkable by at least about 20% in at least one direction and preferably two directions.

The composite may further comprise at least one fibrous layer, which can be placed over or under and stitch-bonded to the shrinkable or adhesive layer. The fibrous layer is preferably less shrinkable than the shrinkable or adhesive layer. The fibrous layer can be substantially non-shrinkable, and the fibrous layer forms second loops when the shrinkable or adhesive layer shrinks. The fibrous layer can be a non-woven layer, a woven layer, a knit layer or a stitch-bonded layer.

The composite may be laminated or embossed to another layer, such as a backing layer.

The present invention is also directed to a method of making this composite.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
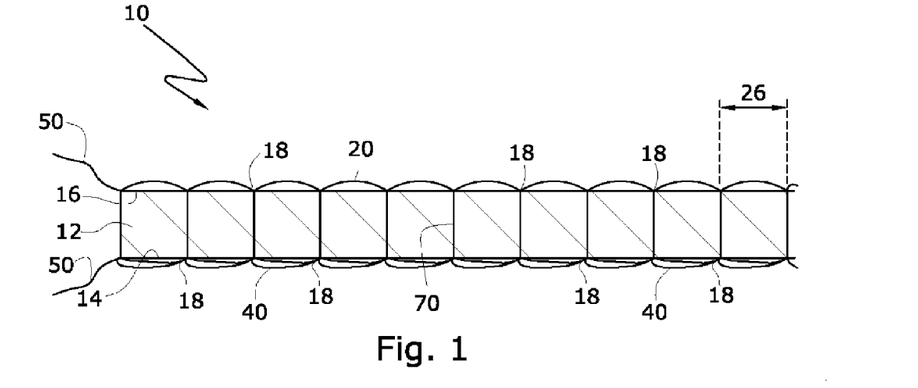
FIG. 1 is a schematic representation of an embodiment of a composite in accordance with an embodiment of the present invention before gathering.

Referring initially to FIG. 1, an embodiment of composite 10 in accordance with the present invention includes an inelastic, shrinkable adhesive layer 12 stitched with a plurality of yarns 50. Adhesive layer 12 is heat shrinkable. Suitable materials for adhesive layer 12 include woven or knit fabrics, non-woven fabrics, knit fabrics, and plastic films. Suitable plastic films include flat sheets having a constant thickness throughout. Suitable materials for adhesive layer 12 include polyethylene, polypropylene, copolyester, copolyamide and combinations thereof. Suitable basis weights for adhesive layer 12 range from about 1 oz/yd$^2$ to about 10 oz/yd$^2$ (about +gm/m$^2$ to 340 gm/m$^2$), preferably 4 oz/yd$^2$ to about 10 oz/yd$^2$ (about 120 gm/m$^2$ to about 340 gm/m$^2$). Adhesive layer 12 includes two surfaces, technical front 14 and technical back 16 opposite technical front 14. As illustrated in FIG. 1, adhesive layer 12 is in a first position before being shrunk.

Adhesive layer 12 is stitch-bonded at plurality of stitching points 18 with yarns 50 that pass completely through adhesive layer 12 from stitching points 18 disposed on technical front 14 to stitching points disposed on technical back 16. Stitching points 18 are disposed on technical front and back 14, 16 in accordance with the desired stitching pattern. Before adhesive layer 12 is shrunk, the underlaps 20 and overlaps 40 of the stitching yarns 50 run substantially parallel to technical front and back 14, 16, except for vertical segments 70 at stitching points 18, as shown in FIG. 1. A single stitching bar (not shown) can be used to produce a single, repeating stitching pattern, or a plurality of stitching bars can be used to simultaneously stitch a plurality of non-bulkable yarns in a plurality of distinct stitching patterns. For example, two stitching yarns can be stitch-bonded onto adhesive layer 12 simultaneously from two separate stitching bars utilizing two different and distinct stitching patterns.

Suitable materials for stitching yarns 50 include, fully oriented filament yarns, flat filament yarns, staple-based yarns, bulked twisted filament yarns, hard or flat or textured filament yarns, textured polymeric yarns and composite flat/textured polymeric yarns. Any yarns can be used, so long as the yarns do not gather or buckle the adhesive layer.

Shrinkage is driven by the adhesive layer. Some shrinkage of yarns 50 is acceptable, as along as the yarns do not cause the adhesive 12 to gather and buckle when exposed to heat.

Figure 2A:
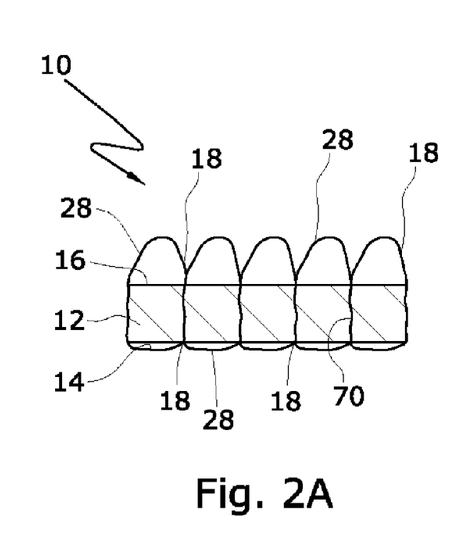
FIG. 2A is a schematic representation of the embodiment of FIG. 1 with flat stitching yarns after gathering.
Figure 2B:
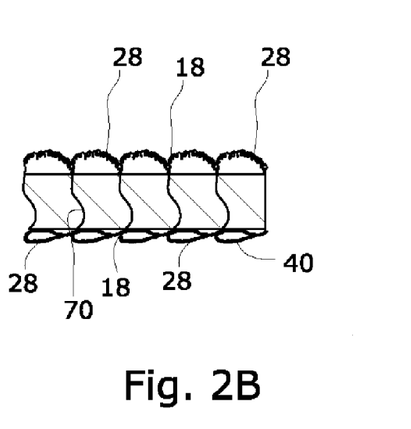
FIG. 2B is a schematic representation of the embodiment of FIG. 1 with textured stitching yarns after gathering.

As shown in FIGS. 2A and 2B, adhesive layer 12 in composite 10 has been shrunk by exposure to heat. Adhesive layer 12 can be shrunk by any desired amount. Preferably, adhesive layer 12 is shrinkable by at least about 10% in at least one direction, and more preferably, adhesive layer is shrinkable by about 10% to about 50% in at least one direction. Preferably, adhesive layer 12 is shrinkable in both the machine direction and transverse (or cross) direction, and more preferably adhesive layer 12 shrinks by at least about 20% in both directions. When shrunk in at least machine direction 22, distances 26 between stitching points 18 decrease. Since the distance between stitching points 18 decreases more than the length of yarns 50 between adjacent stitching points 18, yarns 50 either curl up and/or buckle away from both technical front and back 14, 16 of adhesive layer 12. Yarns 50 may gather and form a plurality of buckles or loops 28 on both the technical front and back 14, 16 of adhesive layer 12 as shown in FIG. 2A. The height or size of each loop 28 depends upon the initial spacing between adjacent stitching points 18 and the percent shrinkage of adhesive layer 12. The density and frequency of loops 28 in the shrunk composite depends on the initial stitch density, the shrinkage ratio and the shrinkage direction. Loops 28 yield a fabric feel and soft hand to the resulting composite 10. Loops 28 also provide composite 10 with a three-dimensional textured outer surface. These loops decrease in height if the yarns are textured or bulkable as shown in FIG. 2B. In such instances small twisted or helical loops are formed along the yarn lengths. Little or no bulking occurs at vertical segments 70 within adhesive layer 12.

In accordance with an aspect of the present invention, the stitching pattern substantially covers the technical back of adhesive layer 12. After adhesive layer 12 shrinks, loops 28 fashioned from the stitching yarns form the outer surface of the composite, and preferably loops 28 substantially cover the underlying shrunk adhesive layer 12. Yarns 50 may comprise multiple colored yarns, so that a desirable pattern is formed after shrinkage. Preferably, composite 10 is stitch-bonded with a gauge from about 3 per inch to about 22 per inch and a count per inch (CPI) of from about 6 per inch up to about 24 per inch. Most preferably, composite 10 is stitch-bonded with a gauge from about 9 per inch to about 22 per inch and a CPI of from about 12 per inch up to about 24 per inch.

In accordance with another aspect of the present invention, as adhesive layer 12 shrinks it reduces the size of the holes around stitching points 18 and advantageously adhesive layer 12 bonds to yarns 50 at stitching points 18. Hence, loops 28 are anchored in the shrunk adhesive layer thereby providing composite 10 with increased dimensional stability.

Once adhesive layer 12 is shrunk, textured composite 10 is a substantially inextensible and inelastic product having, for example, less than about 20% strain under a 5 lb/inch pull on a 1 inch wide by 8 inch long strip of composite 10.

Composite 10 can be directly applied to cover a surface or can be further processed, for example by laminating composite 10 to a backing layer (not shown). As used herein, backing layer includes any layer, composite or laminate being attached to composite 10. Adhesive layer 12 can also be used to bond composite 10 to the surface of a backing layer. Additionally, composite 10 can be embossed to form decorative patterns on the outer surface. Composite 10 can also be embossed and simultaneously bonded and/or laminated to a backing layer.

Figure 3:
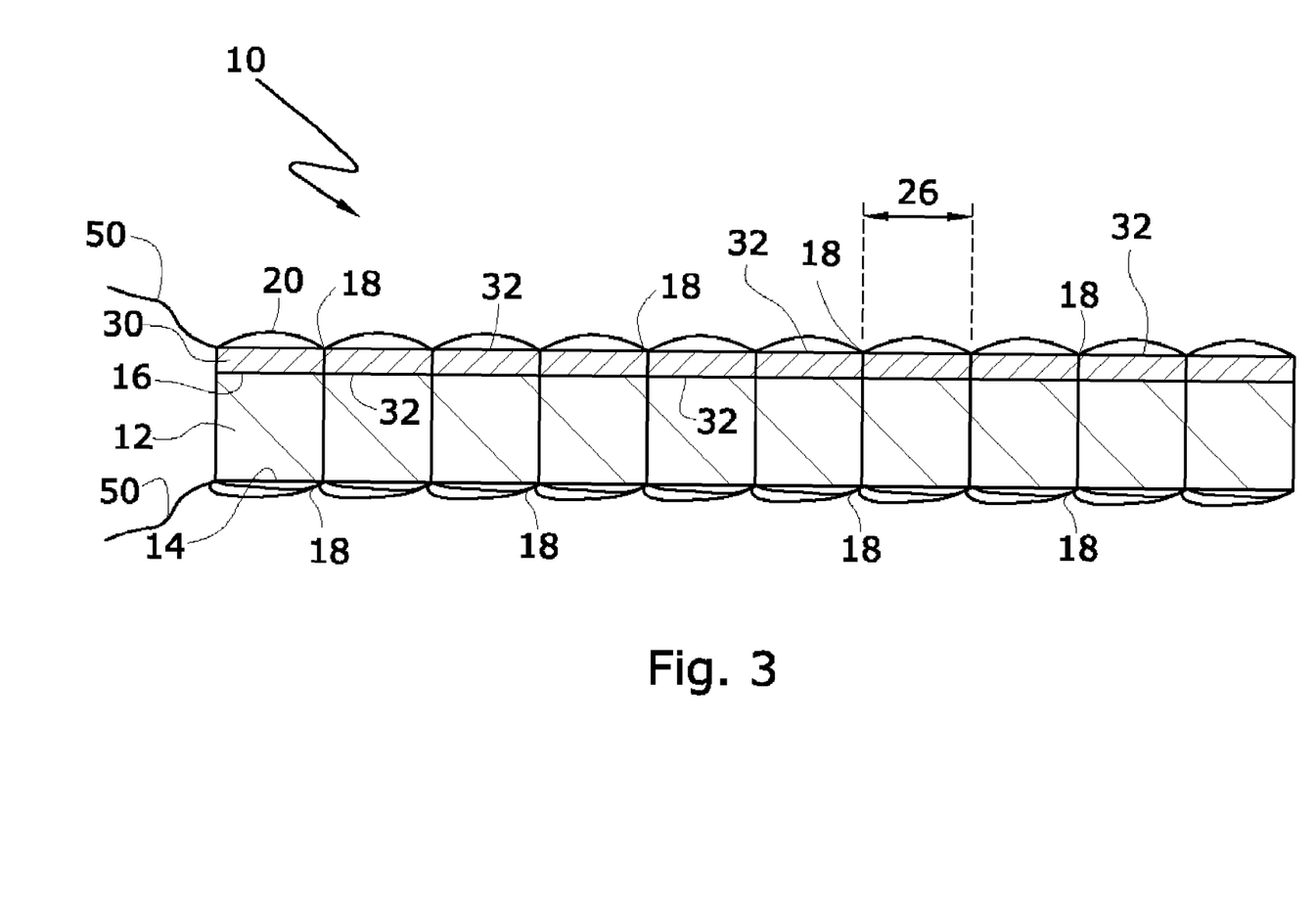
FIG. 3 is a schematic representation of another embodiment of a composite in accordance with the present invention before gathering.

In accordance to another aspect of the present invention, as shown in FIG. 3, composite 10 may also contain one or more fibrous layers 30 in contact with adhesive layer 12 or with other fibrous layers. Fibrous layer 30 can be in direct contact with technical front 14 or technical back 16. Preferably, fibrous layer 30 is positioned on top of adhesive layer 12. In addition, fibrous layer 30 can be smaller, larger or equivalent in thickness and surface area to adhesive layer 12 before adhesive layer 12 is shrunk. Fibrous layer(s) 30 and adhesive layer(s) 12 are stitch-bonded together by yarns 50 at stitching points 18. Multiple adhesive layers 12 having different shrinking properties can be used to make composite 10. Fibrous layer 30 can be substantially non-shrinkable or shrinkable. Suitable fabrics for fibrous layer 30 include non-woven fabrics, woven fabrics, knit fabrics or other stitch-bonded fabrics. In one embodiment, fibrous layer 30 includes from about 10% up to about 50% of a low melt binder. The low melt binder melts when exposed to heat to bond fibers located at the surface 32 of fibrous layer 30. Preferably, the low melt binder melts at a temperature comparable to the temperature at which heat shrinkable adhesive layer 12 shrinks.

Particularly suitable fibrous layers are spunlaced fabrics (hydraulically needled fabrics), wherein the fibers have a three-dimensional configuration due to surface fibers being driven into the lower layers. Such fabrics are particularly amenable to gather in both machine direction and the cross direction. They can also be needled in lower weights as compared to mechanically needled fabrics, avoiding heavy weights after shrinkage.

Figure 4:
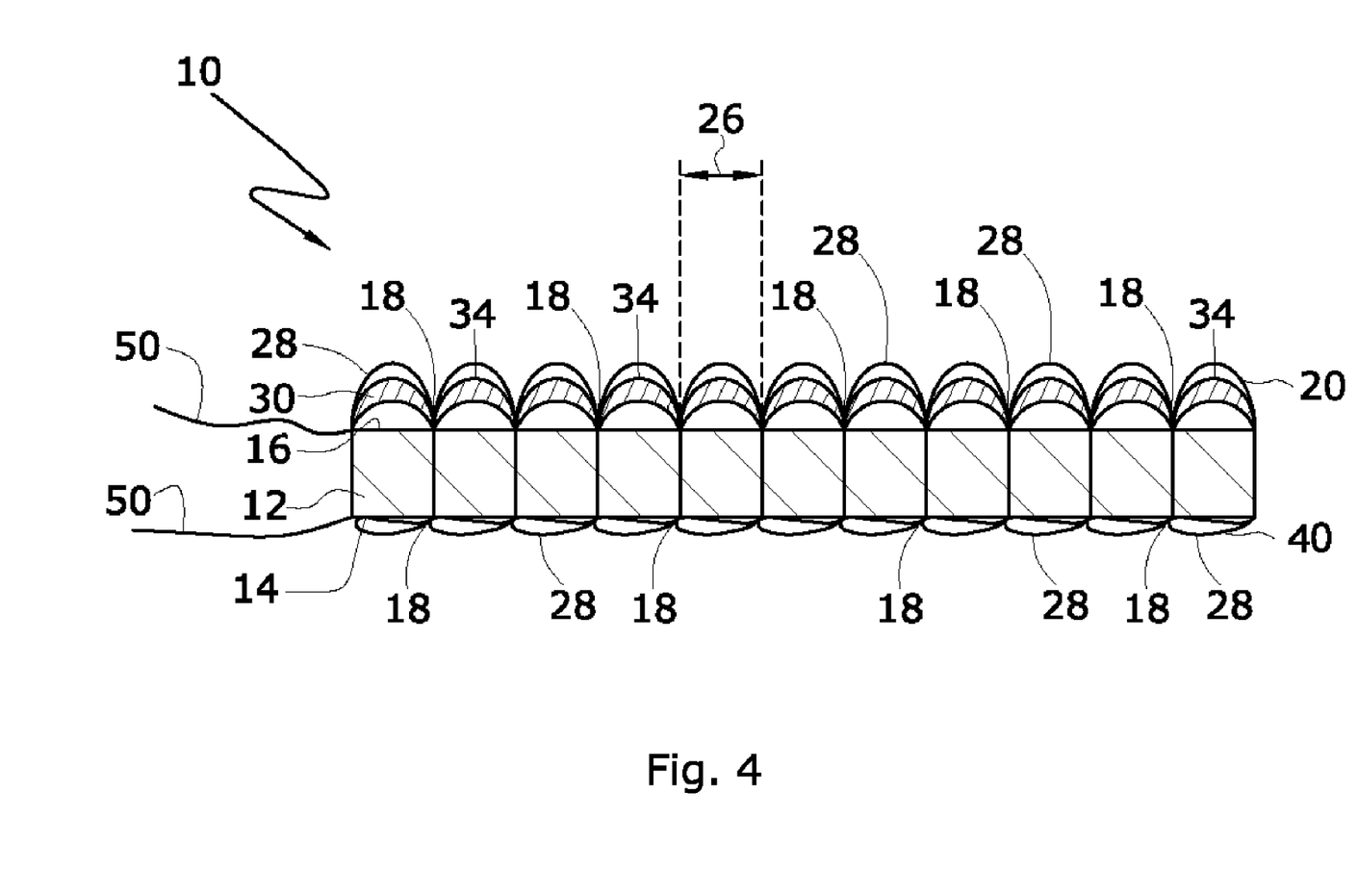
FIG. 4 is a schematic representation of the embodiment of FIG. 3 after gathering.

Before adhesive layer 12 is shrunk, as shown in FIG. 3 fibrous layer 30 is substantially parallel to adhesive layer 12, and preferably is substantially in continual contact with the technical front or back. After adhesive layer 12 is shrunk, as shown in FIG. 4 fibrous layer 30, being either substantially non-shrinkable or less shrinkable than adhesive layer 12, buckles away from adhesive layer 12. This buckling is similar to and occurs simultaneously with the buckling of yarns 50. The buckling forms buckles 34 created from fibrous layer 30 between adjacent stitching points 18. Preferably, fibrous layer 30 is also bonded to adhesive layer 12 at or around stitching points 18 to increase the stability of composite 10. Also, as discussed above, loops 28 created from yarns 50 are also anchored by adhesive layer 12.

An important aspect of the present invention is that the buckling of yarns 50 and/or fibrous layer(s) 30 is driven by the shrinking of a heat shrinkable layer, which is this embodiment is adhesive layer 12, when exposed to heat.

Textured composite 10 can be made in accordance to the following method. First, a suitable inelastic, heat-shrinkable adhesive layer 12 is selected and stitch-bonded at a plurality of stitching points 18 using one or more yarns 50. Yarns 50 shrink less than adhesive layer 12 or at least they develop less shrinking power that the adhesive layer when exposed to heat. Yarns 50 can be stitch-bonded in a single pattern or simultaneously in two or more different and distinct stitching patterns. Once stitch-bonded, adhesive layer 12 is shrunk by applying heat to the adhesive layer and causing the adhesive layer to shrink by at least about 10% to about 50%, and preferably at least about 20%, in at least one direction, and more preferably in two directions. Shrinking of adhesive layer 12 results in an inelastic and dimensionally stable composite 10 in accordance with the present invention.

Textured composite 10 may also include one or more fibrous layers 30 in addition to shrinkable adhesive layer 12. Fibrous layers 30 are preferably non-shrinkable or are less shrinkable than adhesive layer 12. Fibrous layers 30 can be placed in contact with technical front 14 or technical back 16 of adhesive layer 12. Fibrous layers 30 are then stitch-bonded to adhesive layer 12 at the plurality of stitching points 18 using yarns 50, before adhesive layer 12 is shrunk. Preferably, adhesive layer 12 and fibrous layer(s) 30 are stitch-bonded concurrently. Alternatively, adhesive layer 12 can be stitch-bonded with yarns 50 first, and then fibrous layer(s) 30 and additional adhesive layer 12 can be stitch-bonded thereto. If fibrous layer 30 contains a low melt binder, the low melt binder melts upon application of the heat applied to shrink the adhesive layer, bonding fibers in the face of the fibrous layer.

EXAMPLE 1

A composite was prepared having a shrinkable adhesive layer made from a commercial polyethylene film having a thickness of about 5.5 mils. This adhesive layer shrinks by a factor of about 2.1/1 in the machine direction and by a factor of about 1.2/1 in the cross direction when heated to approximately 135° C. for about 10 seconds. When cooled, the adhesive layer "freezes" in its shrunken dimensions, and has a surface area that is equal to approximately 40% of the original surface area and a thickness of about 14 mils. The shrunken sheet stretches less than about 20%, typically about 3% to about 10%, when an 8 inch long and 1 inch wide strip is pulled with a force of 5 lbs.

The adhesive layer is stitch-bonded with 14 gauge stitch-bonding machine using 18 stitches per inch (cpi) from two bars. The front bar carries commercial, flat 150 denier dull polyester yarns, one yarn per guide stitching a tricot stitch 1,0/1,2, and the back bar carries a 220 denier flat bright polyester yarn, one yarn per guide, stitching an opposing tricot stitch 1,2/1,0. The technical back of the fabric is partially covered with the underlaps of the two stitches, leaving the polyethylene partially exposed.

In order to shrink the stitch-bonded adhesive layer, the stitch-bonded composite is placed in a table frame and pinned so as to be allowed to shrink up to a ratio of about 1.8/1 in the machine direction and up to about 1.2/1 in the cross direction. The temperature is first raised to 110° C. using hot air and/or steam. No shrinkage or change is observed. The temperature is then raised to about 135° C. for about 30 seconds. The sample shrinks taut and flat with the underlaps at a frequency of approximately 17 per inch across and about 32 per inch along the length, covering the shrunken film entirely. The composite stretches only approximately 5% in the machine and cross directions when pulled by a force of about 5 lbs/inch. The underlaps and overlaps of the stitched yarns are raised and form loops approximately ¾ mm tall. The underlaps cover the entire surface of the adhesive layer. The product can be easily molded when heated to a range of from about 80° C. to about 130° C. without melting the adhesive. It can also be easily formed into three dimensional shapes with the polyethylene staying on one surface, for example the technical front, without penetrating into the technical back, even when fully melted when heated to a range of from about 140° C. to about 150° C.

EXAMPLE 2

Example 1 is repeated with the addition of a layer of Sontara® Style 8034 polyester nonwoven of about 21 gm/m² weight placed over the shrinkable adhesive layer facing the technical back of the stitched fabric. The adhesive layer is not visible as stitched. Shrinkage and performance are similar to those of Example 1 with the exception that the surface on the technical back is more textile like and richer.

EXAMPLE 3

Example 1 is repeated with the exception that the front stitching bar carries textured nylon 280 denier/68 filaments. The stitch-bonded product is heated to 110° C. using hot air or steam. No shrinkage occurs as in Example 1, but the textured nylon yarns develop a slight crimp. When the temperature is raised to 135° C. the product shrinks in an identical manner to example 1. The loops formed by the flat 220 denier polyester from the back bar appear identical to those in Example 1. The loops formed from the front textured nylon bar are less tall than those in Example 1 and these loops have a helical texture.

Figure 5:
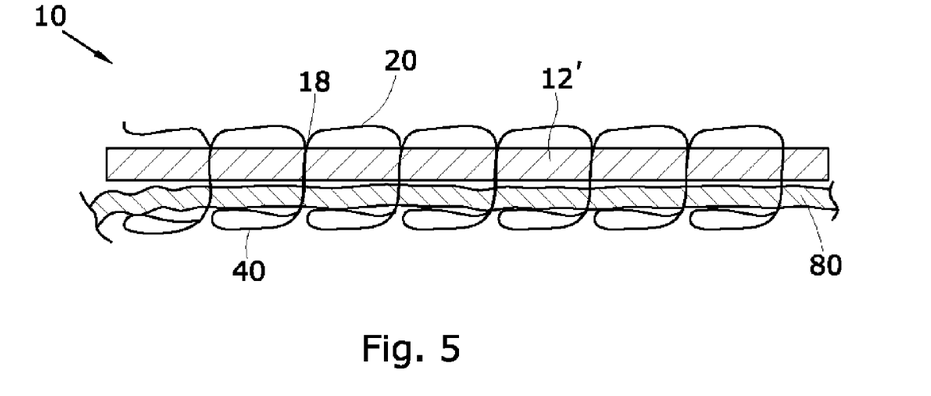
FIG. 5 is a schematic representation of a stitch-bonded shrinkable layer and adhesive layer in accordance to another embodiment of the present invention before gathering.
Figure 6:
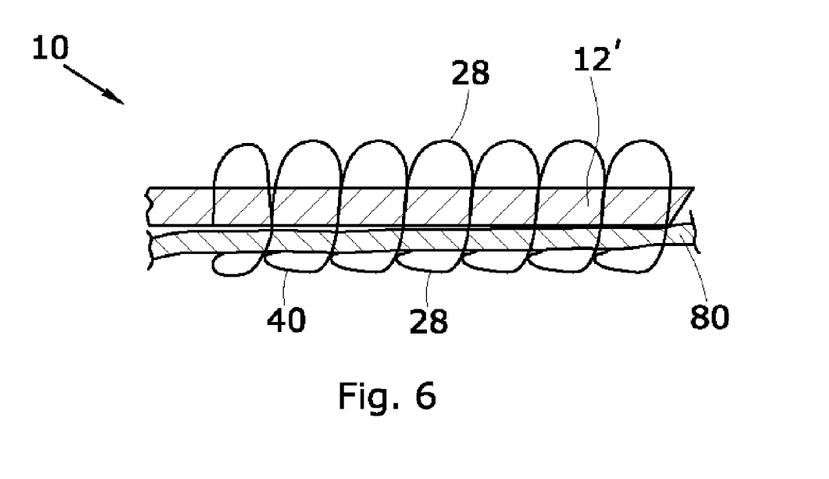
FIG. 6 is a schematic representation of the embodiment of FIG. 5 after gathering where the adhesive layer is shrinkable.
Figure 7:
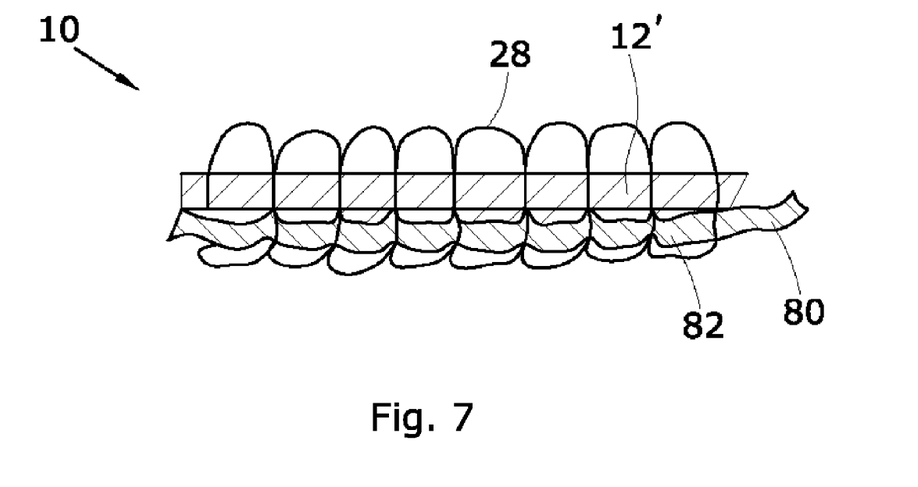
FIG. 7 is a schematic representation of the embodiment of FIG. 5 after gathering where the adhesive layer is non-shrinkable.
Figure 8:
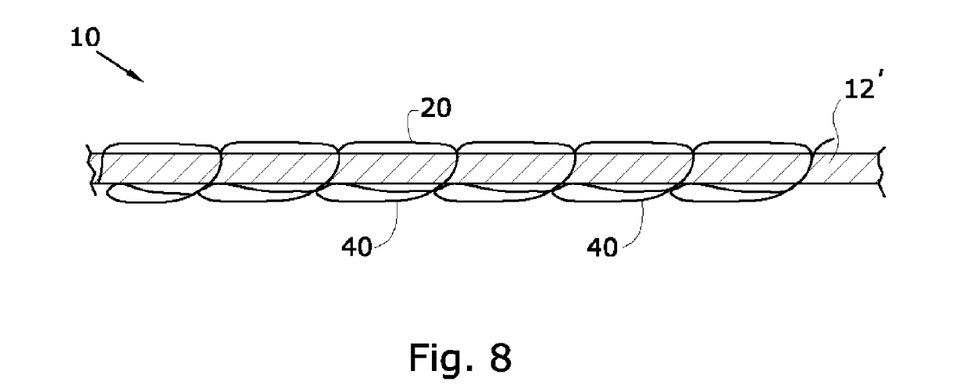
FIG. 8 is a schematic representation of a stitch-bonded layer in accordance with another embodiment of the present invention before gathering.
Figure 9:
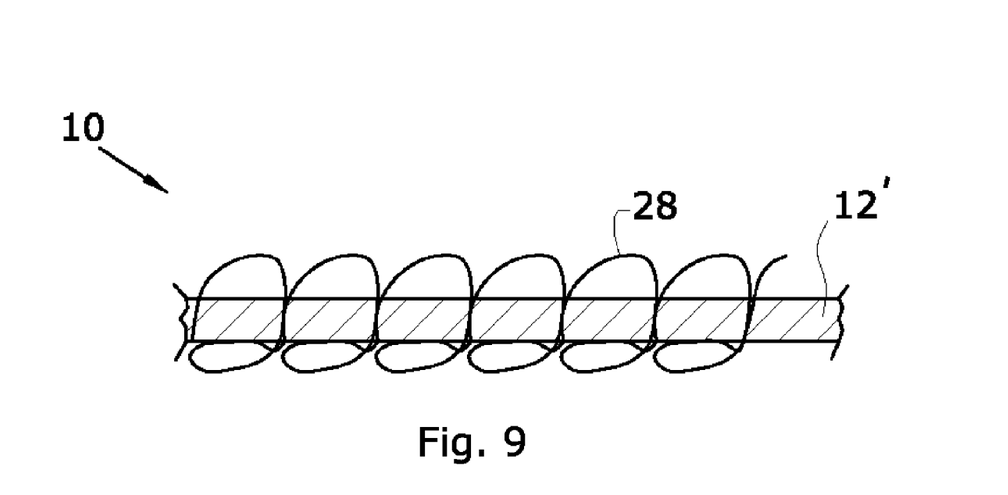
FIG. 9 is a schematic representation of the embodiment of FIG. 8 after gathering.
Figure 10:
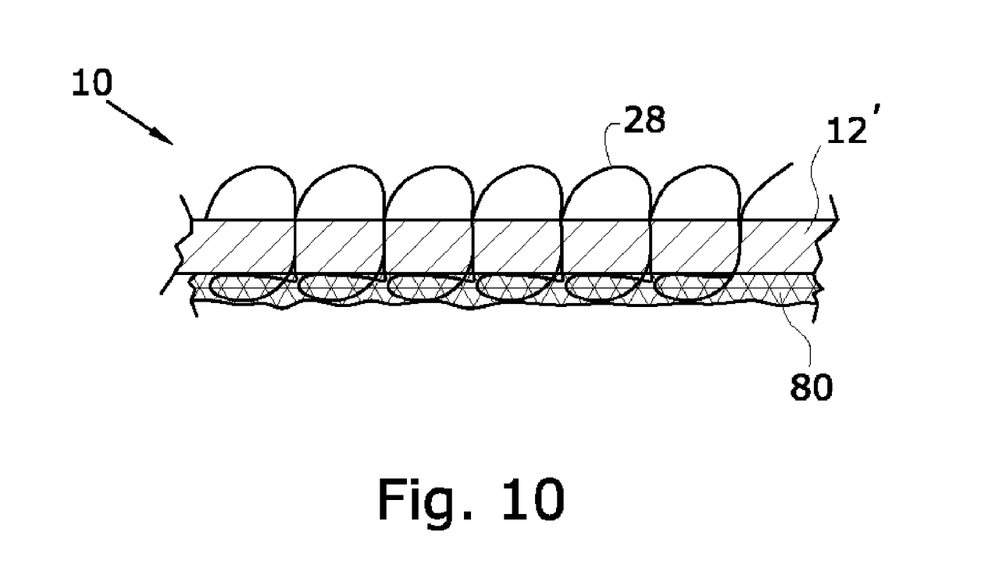
FIG. 10 is a schematic representation of the embodiment of FIG. 9 with a layer of adhesive applied to the back surface.

In accordance to another embodiment of the present invention, the layer 12' is a shrinkable but non-adhesive layer. Second adhesive layer 80 can be applied to the shrinkable layer 12' before, during or after the stitching process, and before, during or after the gathering process, as illustrated in FIGS. 5-10. FIG. 5 shows adhesive layer 80 stitch-bonded along with shrinkable layer 12'. The adhesive layer itself can be shrinkable and shrinks along with shrinkable layer 12' as it gathers, as shown in FIG. 6. It may also be non-shrinkable or less shrinkable than layer 12', and forms loops 82 after shrinkable layer 12' gathers, as shown in FIG. 7. Alternatively, shrinkable layer 12' can be laminated or embossed onto composite 10 after it has been gathered. Alternatively, the shrinkable or non-shrinkable adhesive can be applied to the shrinkable layer 12' before it gathers, and melts into the shrinkable layer when shrinkable layer 12' is heated to gather. Adhesive can be sprayed or pasted on the back surface of the composite after the composite has been stitch-bonded and gathered as shown in FIGS. 8-10.

EXAMPLE 4

Example 3 is repeated with the exception that a shrinkable polyester fabric is placed over the adhesive layer (on the technical back side of the adhesive layer) before stitch-bonding. The polyester fabric consists of a two-bar warp knit prepared from polyester POY yarns 155 denier/34 filament strung up 2-per guide on a 20 gage warp knitter on each bar, and knit at 18 CPI using a 1-0/2-3 and 2-3/1-0 stitch pattern.

The stitch-bonded composite shown in FIG. 5 is first subjected to heat at 100° C. while mounted on the frame as described in Example 1. Only the knit POY polyester knit shrinks taut on the frame, while the yarn underlaps and overlaps buckle into loops as shown in FIG. 7 and the binder sheet also buckles between stitches. The textured yarns develop spiral crimps and only bulk-up slightly at this temperature.

The temperature is raised to 140° C. The textured stitched yarns are fully crimped and pull closer to the fabric surface. The flat yarns remained buckled, and the adhesive film shrinks and flattens along the POY knit layer similar to the illustration in FIG. 6.

The temperature is raised to 190° C. The adhesive melts into the structure but stays on the technical back side of the POY knit layer. The cooled composite has a buckled and looped face (technical back) and an adhesive rich backside (technical front). It is dimensionally stable with less than 8% stretch in any direction.

EXAMPLE 5

The shrinkable POY fabric of Example 4 is replaced with a polypropylene nonwoven sheet (Typar®) weighing 3.2 ounces/square yard, and the polyethylene adhesive film is eliminated. The composite shrinks at about 150° C. The stitching holes close tight and the composite is dimensionally stable but not sufficiently surface stable. A thin layer of Minwax thin polyurethane is applied on the technical front, as shown in FIG. 10, and allowed to dry for one hour at 50° C. in an oven. The buckled/bulked yarns are very surface stable. The composite stretches less than 5% under load.

As discussed herein, the many embodiments of the present invention produce stitch-bonded and gathered composites that do not use elastic sheets or elastic or shrinkable yarns for gathering and buckling. These composites contain a flat layer of substantial weight located in the lower strata that is flat and dimensionally stable after stitching and gathering. In addition, these stitch-bonded products are capable of being permanently and irreversibly moldable and/or embossable without applying stiffening or hardening binders to the raised or buckled surface. These composites are useful in flat or molded embossed applications with or without lamination to backings, in end uses such as flooring, wall covering or upholstery, among many other end uses.

While it is apparent that the illustrative embodiments of the invention disclosed herein fulfill the objectives stated above, it is appreciated that numerous modifications and other embodiments may be devised by those skilled in the art. One such modification is that the shrinkable layer can be composed partly of an adhesive and partly of a non-adhesive. Another modification is that a shrinkable adhesive layer can be augmented with additional adhesive applied after shrinkage. A third possible modification is that the shrinkable layer may be a patterned fabric with low and high shrinkage regions that would result in a patterned buckled surface, among other modifications. Therefore, it will be understood that the appended claims are intended to cover all such modifications and embodiments, which would come within the spirit and scope of the present invention.

What is claimed is:

1. A method of making a composite comprising:
   providing a heat shrinkable layer;
   stitch-bonding the heat shrinkable layer with stitching yarns that are less shrinkable than the heat shrinkable layer;
   exposing the stitch-bonded heat shrinkable layer to heat to shrink said layer; and said shrinkage causing loops emanating from the shrunk layer to form from the stitching yarns.

2. The method of claim 1, wherein the step of providing the heat shrinkable layer comprises the step of selecting said layer to be shrinkable by about 10% to about 50% in at least one direction.

3. The method of claim 2, wherein the heat shrinkable layer is shrinkable in two directions.

4. The method of claim 1, wherein the step of providing the heat shrinkable layer comprises the step of selecting said layer to be shrinkable by at least about 20% in at least one direction.

5. The method of claim 4, wherein the heat shrinkable layer is shrinkable in two directions.

6. The method of claim 1, wherein the step of stitch-bonding the heat shrinkable layer comprises stitching in two or more distinct stitching patterns.

7. The method of claim 1, wherein the composite is laminated to a backing layer.

8. The method of claim 1, wherein the composite is embossed to a backing layer.

9. The method of claim 1, further comprising the steps of selecting a fibrous layer and stitch-bonding the fibrous layer with the heat shrinkable layer.

10. The method of claim 9, wherein the fibrous layer comprises a spunlaced nonwoven.

11. The method of claim 9, wherein the step of selecting the fibrous layer includes selecting a fibrous layer that is substantially non-shrinkable.

12. The method of claim 9, wherein the step of selecting the fibrous layer includes selecting a fibrous layer that is less shrinkable than the heat shrinkable layer.

13. The method of claim 9, further comprising the step of forming second loops created from the fibrous layer.

14. The method of claim 1, wherein the heat shrinkable layer is an adhesive layer.

15. The method of claim 1 further comprising the steps of providing an adhesive layer and bonding the adhesive layer to the heat shrinkable layer.

16. The method of claim 15, wherein the adhesive layer is shrinkable.

17. The method of claim 15, wherein the adhesive layer is substantially non-shrinkable.

18. The method of claim 14, wherein the step of exposing the stitch-bonded adhesive layer includes the step of bonding the stitching yarns to the adhesive layer.

19. The method of claim 15, wherein the step of exposing the stitch-bonded adhesive layer includes the step of bonding the stitching yarns to the adhesive layer.

* * * * *